No. 624,378. Patented May 2, 1899.
H. A. RANDS.
THRESHING MACHINE.
(Application filed Apr. 10, 1897.)
(No Model.) 7 Sheets—Sheet 1.

Fig. 1.

WITNESSES:
H. Hellyer
J. W. Acker

INVENTOR
H. A. Rands.
BY
Munn
ATTORNEYS.

THE NORRIS PETERS CO., PHOTO-LITHO., WASHINGTON, D. C.

No. 624,378. Patented May 2, 1899.
H. A. RANDS.
THRESHING MACHINE.
(Application filed Apr. 10, 1897.)
(No Model.) 7 Sheets—Sheet 2.

Fig. 2.

WITNESSES:
H. Hellyer.
J. A. Acker.

INVENTOR
H. A. Rands.
BY
Munn
ATTORNEYS.

THE NORRIS PETERS CO., PHOTO-LITHO., WASHINGTON, D. C.

No. 624,378. Patented May 2, 1899.
H. A. RANDS.
THRESHING MACHINE.
(Application filed Apr. 10, 1897.)
(No Model.) 7 Sheets—Sheet 3.

WITNESSES:

INVENTOR
H. A. Rands.
BY
ATTORNEYS.

No. 624,378. Patented May 2, 1899.
H. A. RANDS.
THRESHING MACHINE.
(Application filed Apr. 10, 1897.)
(No Model.) 7 Sheets—Sheet 4.

WITNESSES
INVENTOR
H. A. Rands.
BY
ATTORNEYS.

No. 624,378. Patented May 2, 1899.
H. A. RANDS.
THRESHING MACHINE.
(Application filed Apr. 10, 1897.)
(No Model.) 7 Sheets—Sheet 5.

WITNESSES:

INVENTOR
H. A. Rands.
BY
ATTORNEYS.

No. 624,378. Patented May 2, 1899.
H. A. RANDS.
THRESHING MACHINE.
(Application filed Apr. 10, 1897.)
(No Model.) 7 Sheets—Sheet 6.

WITNESSES:

INVENTOR
H. A. Rands
BY
ATTORNEYS.

No. 624,378. Patented May 2, 1899.
H. A. RANDS.
THRESHING MACHINE.
(Application filed Apr. 10, 1897.)
(No Model.) 7 Sheets—Sheet 7.

WITNESSES: INVENTOR
H. A. Rands.
BY
ATTORNEYS.

UNITED STATES PATENT OFFICE.

HAROLD ALVA RANDS, OF FOREST GROVE, OREGON.

THRESHING-MACHINE.

SPECIFICATION forming part of Letters Patent No. 624,378, dated May 2, 1899.

Application filed April 10, 1897. Serial No. 631,531. (No model.)

*To all whom it may concern:*

Be it known that I, HAROLD ALVA RANDS, of Forest Grove, in the county of Washington and State of Oregon, have invented a new and useful Improvement in Threshing-Machines, of which the following is a full, clear, and exact description.

The object of my invention is to provide a metal frame for a threshing-machine so constructed that it will be virtually a truss-frame and will be light and exceedingly strong, as well as economic in construction.

Another object of the invention is to provide a metallic separating-rack and to construct the rack in two sections driven direct from a crank, one section balancing the other, and, furthermore, to construct the separating-rack in such manner that the metal portion of said rack at a predetermined point in its length will be raised in such manner that the rack will operate to spread the straw evenly.

Another object of the invention is to provide a simple and readily-operated device by means of which the concave may be lowered, enabling a person to gain access to the concave and to the cylinder.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Fig. 17 is a transverse section through the machine above the chaffing-riddle, illustrating the application thereto of the adjusting device.

The body of the machine—in fact, all of the frame—is constructed of metal. Steel, iron, or any other desired metal may be employed. Steel, however, is usually preferred for many of the parts.

Figure 1:
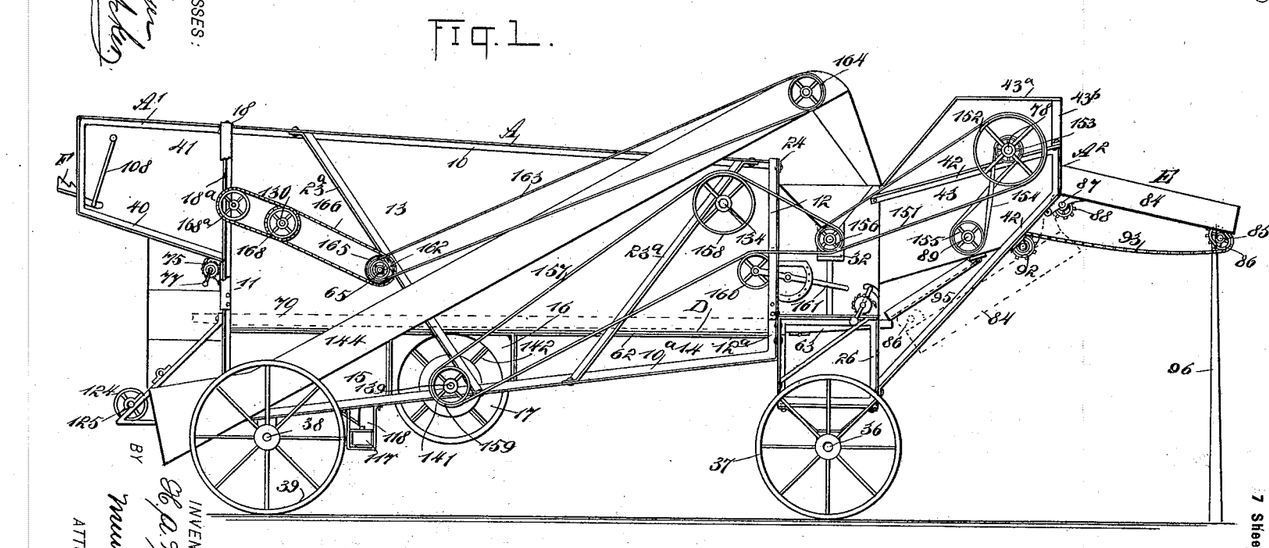
Figure 1 is a side elevation of the improved threshing-machine.

The side frames of the body are each made of one piece of angle-iron and comprises an upper straight member 10, a rear downwardly-extending member 11, a bottom upwardly and forwardly-inclined member $10^a$, and two forward vertical members 12 and $12^a$, which may be fastened together or attached to a near-by support, as shown in Fig. 1. Thus strength, rigidity, and economy of construction are obtained. If, however, it is found desirable, the side frames may be made in two or more sections.

One or more panels are employed in connection with each side frame. In the drawings, Fig. 1, a large panel 13 is shown, which is secured to the top and the front and rear angle-irons of the side framing, the panel being of metal, usually sheet-steel. The panel 13 extends downwardly within a predetermined distance of the lower bar of the frame and is usually provided with a narrow strengthening lip or flange at its lower edge, turned outward, and the space that would intervene this lower bar and the lower edge of the main panel 13 is shown filled up by a front panel 14, a rear panel 15, and a blower or fan cage or casing 16, the cage or casing having an opening 17 in each of its ends for the admission of air. The space above referred to may be left open as far as the fan cage or casing 16 and the cage or casing 16 be provided with an opening, which may be varied in size by sliding doors in each of its ends, and the space rearwardly to the back end of the main frame be closed by the panel 15, which is fitted with a lip turned out on the upper edge to correspond to the lip on the lower edge of the panel 13.

At the back a cross-bar 18 of angle-iron is carried across the top of the side framing and beyond the outer faces thereof, and this top cross-bar at each end is bent upon itself and is carried downward to meet the uprights 11 of the side framing, forming side angular braces. The bottom cross-bar 19 at the back is of angle-iron, as shown in Fig. 4.

Figure 3:
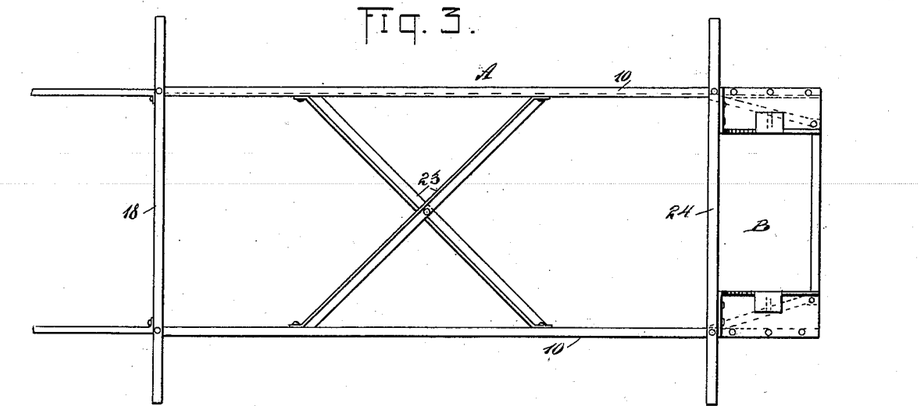
Fig. 3 is a plan view of the frame of the machine, the top of said frame having been removed.
Figure 4:
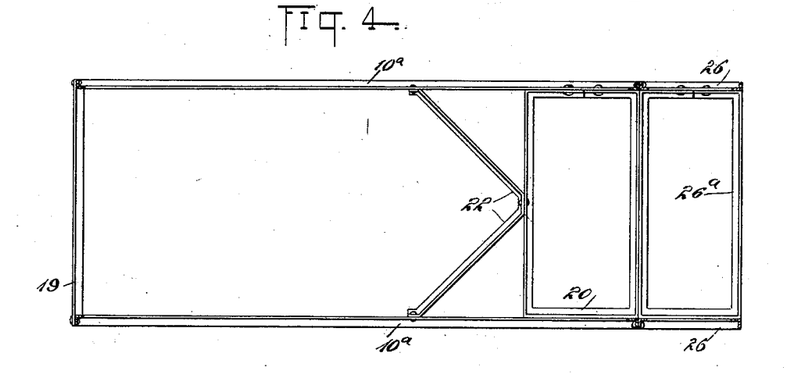
Fig. 4 is a section taken substantially on the line 4 4 of Fig. 5, showing the bottom of the frame in plan.

At the front bottom portion of the body the framing is strengthened by a skeleton brace-frame 20, preferably of one piece, secured to the lower angle-irons of the side framing, and an angular brace 22 is secured at the junction of its members to the inner side portion of the frame-brace 20, the ends of the angular brace being secured to the side framing of the body, as shown in Fig. 4. The side framing at the top is stayed by X-braces 23, (shown in Fig. 3,) while the sides of the frames are independently strengthened by diagonal bars 23ª, extending from the top bar to the bottom bar of said frame, the brace-bars diverging at their upper ends and converging at their lower ends. In fact, all of the bars used in the construction of the framing are preferably angle-bars.

At the front of the body a cross-bar 24 is secured, which extends beyond the side members of the body in like manner as the rear upper cross-bar 18. The upper cross-bar 24 is also bent upon itself and carried downward to a connection with the front uprights of the sides, as shown at 24ª in Fig. 5.

Figure 5:
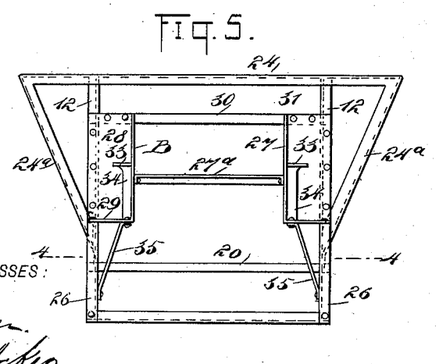
Fig. 5 is a front elevation of the body-frame.
Figure 6:
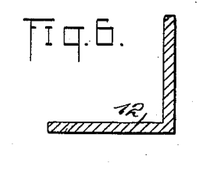
Fig. 6 is a transverse section through one of the members of the frame.

Side frames 26, made usually of one piece of angle-iron and of angular construction, are bolted, riveted, or otherwise attached at their rear portions to the lower front portion of the body-frame, as shown in Fig. 1, and a box-frame 26ª connects the side frames, forming the lower portion or support for a cylinder-frame B. The box-frame is also made of one piece of angle-iron. This cylinder-frame consists of two plates 27, each provided with an outwardly-extending side flange 28 and a bottom flange 29, extending forwardly from the side flange. The side flanges are bolted or riveted to the front uprights of the box-frame, as shown in Fig. 5, and to a cross-bar 30 at their upper ends, which cross-bar extends from one front upright 12 to the other. The space between the cross-bar 30 and the upper cross-bar 24 is closed by a panel 31, preferably of metal.

In the upper edge of each plate 27 of the cylinder-frame an opening 32 is made, which is flaring at the top and rectangular at the bottom, as shown in Fig. 1. At the bottom of each opening 32 the metal is carried horizontally, forming a shelf 33, supported by a column 34, and braces 35, attached to the front portion of the body-frame, are also secured to the bottom portions of the cylinder-frame. The openings 32 are adapted to receive the boxes in which the cylinder-shaft is to turn.

A front axle 36 pivotally supports the front portion of the threshing-machine frame, being provided with suitable ground-wheels 37. The rear axle 38 is attached directly to the rear portion of the machine-frame and is provided with ground-wheels 39.

Figure 2:
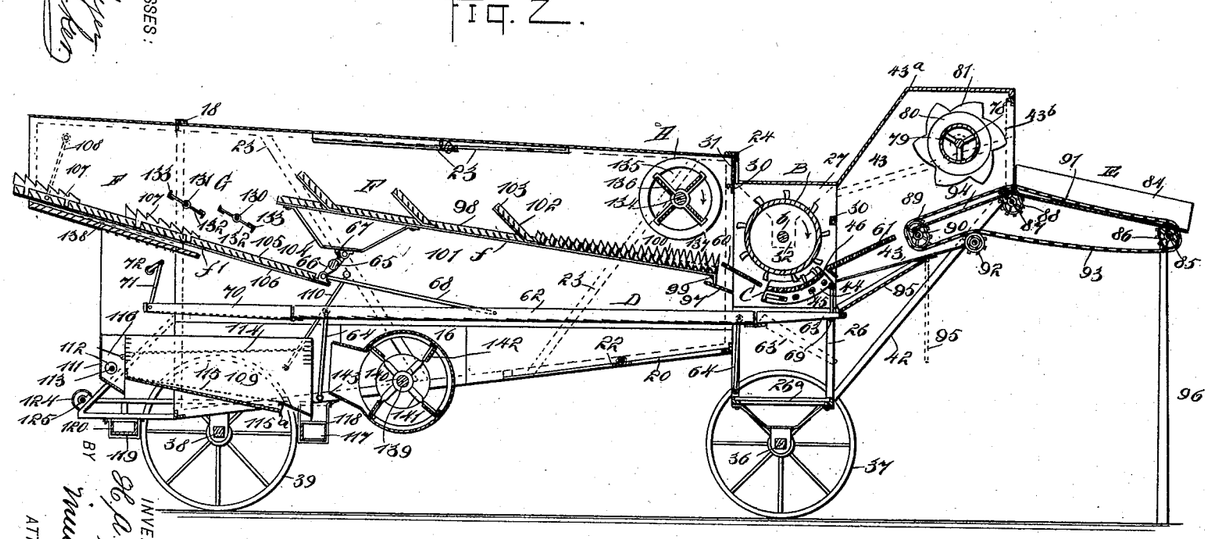
Fig. 2 is a central longitudinal section through the machine.

An extension A' is made from the rear upper portion of each side of the body. Each extension consists of a frame 40, which is made of one piece of angle-iron and is attached to a rear upright of the body-frame, the frame 40 having attached thereto a panel 41, preferably of metal. An extension A² is made from the front side portions of the cylinder-frame, each extension consisting of an angular frame 42, made of angle-iron, usually in one piece, the lower or bottom members whereof are attached to the box-frame 26ª of the cylinder-frame and extend upwardly and forwardly, while the upper members are secured to the upper portion of the side plates 27 of the cylinder-frame, as shown best in Fig. 1. A cross-bar 27ª is employed to connect the front portions of the cylinder-frame sides, and the front and rear extension-frames 40 and 42 are preferably made of a single piece of angle-iron bent upon itself to the desired form, and a panel 43 is secured to the front extension-frames 42, which panels, although they need not cover the entire lower portions of said frames 42, are carried upward above the upper portions of these frames. A housing 43ª is provided for the forward extensions, forming a hood therefor, the hood connecting with the closed top portion of the cylinder-frame, as indicated in Fig. 2. The extension-frames 42 are connected by an arched bar 43ᵇ, so as not to interfere with the bundles entering the machine, and the entire frame is decked over at the top.

The cylinder B is of the usual construction and is mounted on a shaft $b$, which is journaled in suitable boxes located in the aforesaid openings 32 in the cylinder-frame. The concave C is likewise of the usual construction, as particularly shown in Figs. 11, 12, and 13, comprising the sides or circles 44, connected by bolts 45 and carrying a floor 46, to which the teeth are secured. The concave, however, differs from the ordinary concave in the manner in which it is placed in the machine, being adjustable to and from the cylinder, so that access may be readily gained to the upper face of the concave and to the peripheral surface of the cylinder over the concave. Usually a slot 47 is made longitudinally in the lower flange of each section or side 44, near its rear end, as shown particularly in Fig. 11, and blocks 48 are loosely mounted in the slots 47, the blocks being secured upon a rod 49, which extends through from one side of the machine to the other.

Figures 11, 14, 15:
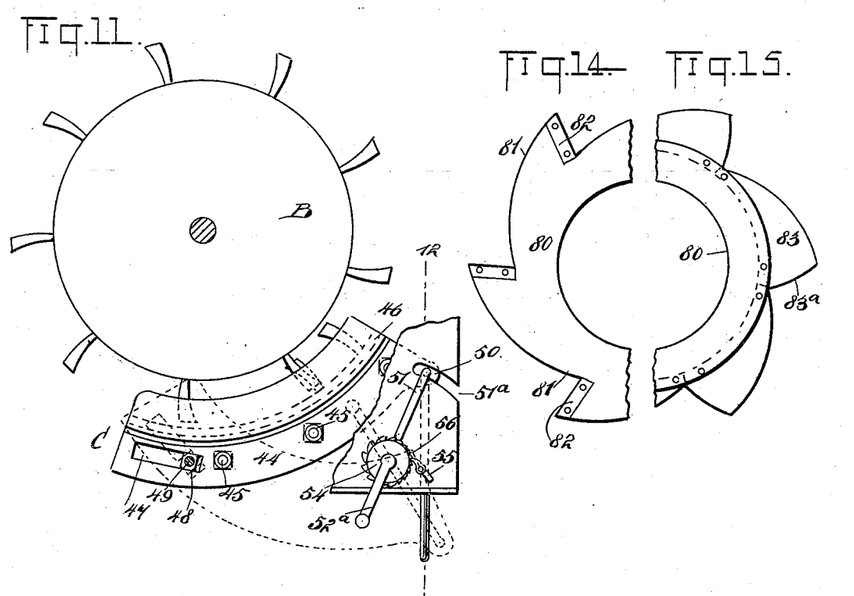
Fig. 11 is a detail view illustrating the mechanism for raising and lowering the concave, showing said concave and cylinder in end view.
Figs. 14 and 15 are detail views of parts of the cutter-knives.
Figure 12:
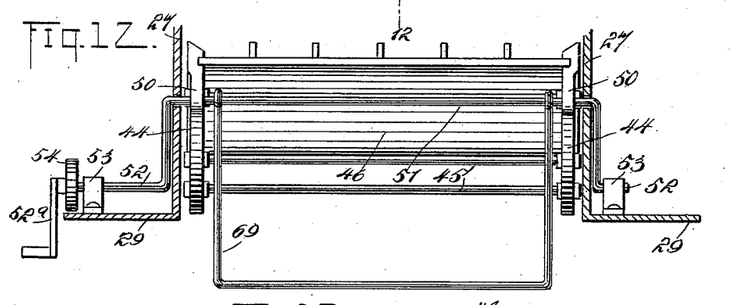
Fig. 12 is a transverse section through the machine in front of the concave, the section being taken substantially on the line 12 12 of Fig. 11.

A lip 50 is formed at the forward end of the flanged portions of the concave-circle, and through these lips the crank-arm 51 of a crank-shaft 52 is passed, the crank-arm extending out through slots 51ª, made in the sides of the machine. The ends of the crank-shaft 52 are journaled in suitable bearings 53, located on the lower flanges of the side plates 27 of the cylinder-frame, as shown in Fig. 12. A handle 52ª is secured to one of the outer ends of the said crank-shaft 52. A ratchet-wheel 54 is secured on the crank-shaft adjacent to the handle 52ª, the double set of teeth 56 of which are engaged by a pawl 55, located on the outer face of the machine-frame, as shown in Fig. 11. The teeth at one side of said wheel are made quite small and are placed close together. The side of the ratchet-wheel having these closely-grouped teeth will be the side that is removed from the concave and which faces the pawl when the concave has been brought up practically to its normal position.

Under the above construction it is obvious that the concave may be raised or lowered for the purpose set forth and that by providing the ratchet-wheel with the closely-grouped teeth a very fine adjustment of the concave may be secured when the concave is in its proper position relative to the cylinder.

Figure 13:
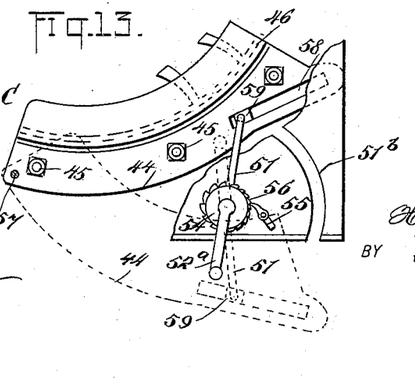
Fig. 13 is a side elevation of the concave and an end view of the adjusting and hoisting device, illustrating the application of the device to the concave in a slightly different manner than shown in Fig. 11.

In Fig. 13 I have illustrated a slight modification in the application of the adjusting or hoisting device for the concave. In said Fig. 13 the concave is shown as pivoted by a pin 57 at its rear end and provided with a slot 58 in each side at its forward end. A block 59 is mounted to slide in each of the slots 58, and in this instance the crank-arm 51 of the crank-shaft 52 passes through the sliding block 59. A suitable slot or way 51ᵇ is made in the side of the machine-body to admit of the necessary movement of the crank-arm as the concave drops. The concave is illustrated in its lower position in dotted lines in both Figs. 11 and 13.

The usual grating 60 is located back of the concave and beneath the cylinder, and a second grating 61 is located in front of the concave, over which the material to be threshed is passed. The grain-conveyer D is of box-like construction and is provided with a rough bottom, said bottom being stepped in direction of the rear of the machine. This box may be made of any desired material, either wood or metal. The box is made in two sections—a body-section 62, located mainly within the body portion of the machine and extending a slight distance beneath the cylinder, and a front or head section 63, which is hinged to the forward end of the body-section in a manner to drop downward. The head-section 63 of the grain-conveyer extends beyond the front of the cylinder-chamber, as shown in Fig. 2, even when the grain-conveyer is at the limit of its rearward throw. By hinging the front or head section of the conveyer to the front end of the body, as shown, the said front or head section can be lowered to permit the concave to be lowered, as hereinafter described. The body of the grain-conveyer is supported by rocker-arms or links 64, pivoted to the sides of the conveyer and to the frame of the machine casing or body.

The grain-conveyer is driven from a shaft 65, extending transversely of the body of the machine and provided with one or more, usually two, opposing crank-arms 66 and 67, and to one of these crank-arms a link 68 is pivoted, the link being likewise pivotally connected with the central portion of the grain-conveyer. The head 63 of the grain-conveyer is supported in its normal or receiving position by means of a yoke 69 or its equivalent, which yoke is connected with or carried by the crank-arm 51 of the adjusting or hoisting device for the concave, so that as the concave is raised or lowered the head of the grain-conveyer will be correspondingly adjusted.

The chaffing-riddle 70 is pivotally attached to the rear end of the grain-conveyer. This chaffing-riddle is adjustable, and its adjustment may be made while the machine is in operation. This is accomplished, as shown particularly in Figs. 16 and 17, by supporting the rear end of the riddle by means of links 71, the links being carried by a crank-shaft 72, journaled in bearings 73 upon the outer side faces of the casing of the machine, the crank-arm of the shaft being within the frame and the shaft having movement in slots 74, made in the sides of the casing.

Figure 16:
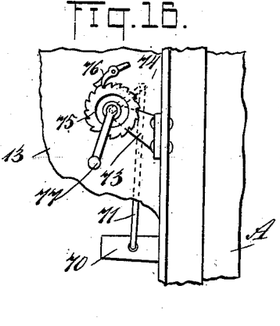
Fig. 16 is a detail view illustrating the mechanism for raising and lowering the chaffing-riddle, the said view being taken from the exterior of the machine, a portion of its side being broken away.
Figure 17:
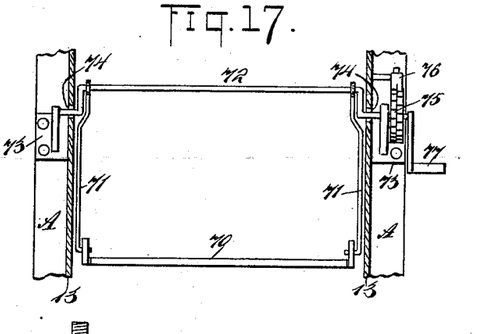

A ratchet-wheel 75 is secured to one end of the crank-shaft 72, the shaft being turned through the medium of a handle 77, and the ratchet-wheel 75 is provided with a double set of teeth, as shown particularly in Fig. 17, both sets of teeth being engaged by the same pawl 76; but the pawl is split and its members carried in opposite directions, as shown in Fig. 16, so that one member will engage with one set of teeth and the other with the second set. By means of this double set of teeth not only a quick but a very close adjustment may be obtained. The double ratchet is designed to hold the shaft 72 in any desired position. Thus when the crank is to the right of a perpendicular central line drawn through the ratchet-wheel the weight of the chaffer tends to rotate the ratchet to the right and it is held by one pawl, but when the crank is to the left of said line the ratchet will be held by the opposing pawl.

By the above-described construction the crank may be turned through a complete revolution, thus permitting the throw of the crank to be varied, so that a more or less violent movement may be imparted to the chaffer, as desired.

A shaft 78, designed to carry a cutter, is journaled in suitable bearings placed upon the upper surfaces of the front extension-frames 42. A cylinder 79 is secured to the shaft 78 within the hood 43ª, and a series of knives 80 is obliquely secured on the cylinder, each knife being of a ring-like form, comprising a hub and teeth or blades 81, carried by or integral with said hub. The teeth or blades may be of different shapes, and two constructions of knives are shown in Figs. 14 and 15. In the construction shown in Fig. 14 the teeth and the hub are integral and each tooth is provided with a straight edge and with a long curved edge meeting the straight edge of each tooth. At each straight edge a cutting edge 82 is removably secured, whereas under the construction of the knife shown in Fig. 15 the teeth or blades 83 are secured to the hub, and the edge corresponding to the straight edge 82 of the knife previously described is convexed, forming a cutting edge 83ª. The cutting edge may either be removably secured to the knife or the knife itself may be ground to a cutting edge, or the knife may be made in such manner that the ring or hub, blade, and cutting edge are integral, as illustrated in Fig. 2.

The feed mechanism E is as follows: A trough 84 is hinged to the upper front portion of the front extension 42 in such manner that it may drop downward to an engagement with the inclined lower portion of this section when the feed mechanism is not in use. Near the forward end of the trough 84 a shaft 85 is journaled in suitable bearings, and the said shaft carries near each of its ends an elliptical gear 86. A second shaft 87 is journaled to the extension 42 of the body-frame adjacent to where the trough is hinged to the body, and said shaft 87 is likewise provided with two elliptical sprocket-gears 88. A third shaft 89 is journaled near the forward end of the forward grating 61 of the concave, and this shaft is provided with two elliptical gears 90. An endless chain belt 91 is passed over the elliptical gears and is carried to an engagement with an idler 92, as shown in Fig. 2. The endless chain belts pass through and over the floor of the trough and are connected by bars 93 or their equivalents. Between the elliptical gears 88 and 90 a platform 94 is secured in the casing of the machine, the said platform having a downward inclination, corresponding practically to that of the front grating 61, since the inner sprocket-wheels 90 are lower than the intermediate sprocket-wheels 88.

An inclined floor 95 is hinged to suitable supports in the space between the extension-frames 42, the lower end of the inclined floor normally resting upon the forward end of the head of the grain-conveyer, as shown in Fig. 2. Any grain that may have been threshed out on the platform 94 will fall upon the inclined floor 95 and be conducted to the grain-conveyer 62. The inclined floor will also serve to conduct to the conveyer the grain received from the concave-grating 61. When the feed mechanism is in operation, the trough 84 is supported by legs 96, which may or may not be permanently attached to said trough. When the head of the grain-conveyer is dropped at the lowering of the concave, the inclined floor 95 will drop out of the way, assuming the vertical position shown in dotted lines in Fig. 2.

Figures 8, 9, 10:
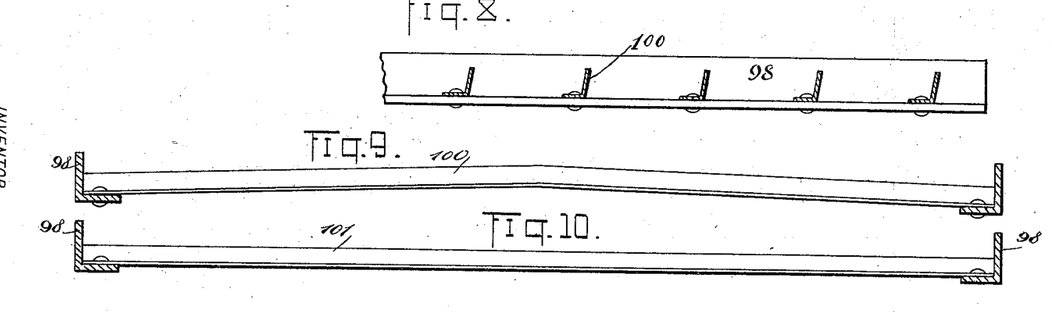
Fig. 8 is a detail view of one of the side bars of the separating-rack, the cross-bar being in section.
Fig. 9 is a transverse section through the rack at that portion where its cross-bars are arched or raised at the center.
Fig. 10 is a transverse section through the separating-rack, illustrating the cross-bar as straight.

The grain-separating rack is made in two sections $f$ and $f'$, the entire rack being designated as F. The forward section $f$ of the separating-rack has bearing upon a shelf 97, located at the front of the body, above the grain-conveyer. The rack is preferably made entirely of metal, and the front section $f$ consists of side pieces 98, of angle-iron, having their forward ends bent down to form feet 99, which rest upon the shelf 97. A series of cross-bars 100, preferably also of angle-iron, extend from one side beam 98 to the other, and, as shown in Figs. 2 and 9, these cross-bars are highest at their centers, sloping from said centers in direction of the sides of the rack. The arched cross-bars 100 may be graduated in height, the forward bars being the highest, as shown in Fig. 2, or they may be of the same height. The arched bars extend nearly to the center of the rack, and the body of the remaining portion of the rack consists of straight cross-bars 101, made of angle-iron. At intervals in the length of the forward section of the separating-rack, between the arched bars and the rear end of said section, risers 102 are secured to the side beams, the risers being also made of angle-iron. The risers are connected by cross-bars 103, preferably of angle-iron, as shown in Fig. 2.

A yoke 104 is attached to the bottom of the front section of the separating-rack near its rear end, the yoke being pivotally connected with the crank-arm 67 of the shaft 65. The rear section $f'$ of the separating-rack is below the forward section and comprises side beams 105, of angle-iron, cross beams or bars 106 of the same cross-sectional shape, and fish-back plates 107, or plates having saw-tooth upper edges, the fish-back plates being secured upon the cross-bars 105 in rows. The forward end of the rear rack-section $f'$ is attached to the crank-arm 66 of the shaft 65 and the rear end of the rear rack-section is supported by swinging arms 106.

Figure 18:
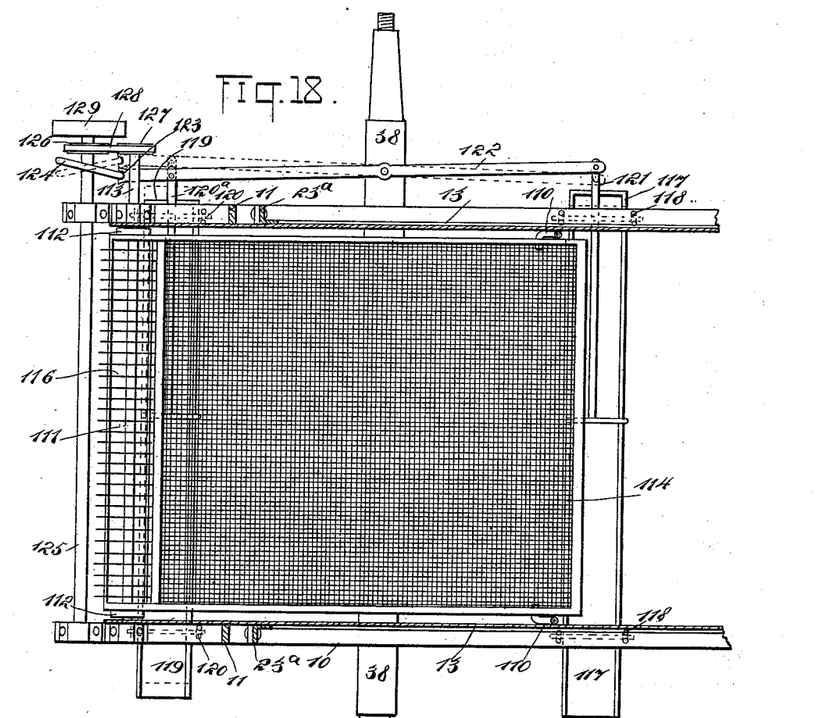
Fig. 18 is a horizontal section taken above the chaffing-riddle and shoe through the rear portion of the machine.
Figure 19:
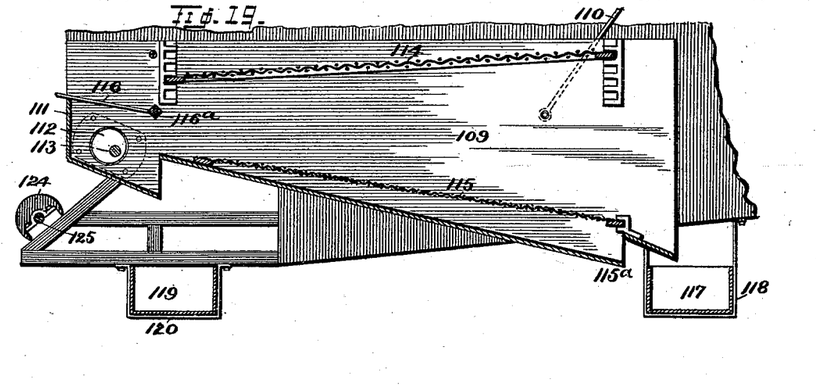
Fig. 19 is a longitudinal section of the shoe.
Figure 20:
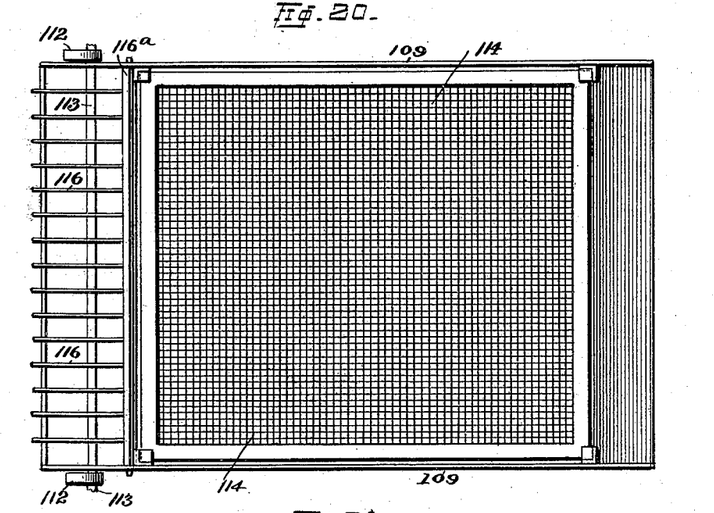
Fig. 20 is a plan view of the same.
Figure 21:
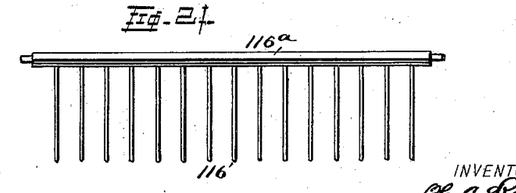
Fig. 21 is a detail view of the fingers which project over the box at the rear end of the shoe.

The shoe 109, which is located beneath the chaffing-riddle, is made of metal and is deepest at its forward end, which is open, the forward end of the shoe being connected with the sides of the machine casing or body by means of spring-arms 110. A box 111 is formed at the rear end of the shoe, and in a bearing on the outside of each side of the box a cam 112 is located, mounted upon a shaft 113, which shaft extends through and beyond the side walls of the body, as shown in Figs. 18 and 20. By arranging the cam-shaft in the box 111 a rotary motion is given to the rear end of the shoe which could not be obtained by arranging it in any other position. The location is also desirable, since access can be readily had to it for repairs or otherwise. A horizontal sieve 114 is adjustably placed in the top portion of the shoe and a lower inclined sieve 115 is placed near the bottom of the shoe. Fingers 116, carried by the bar $116^a$, mounted in the shoe below the upper sieve, project over the box 111, as shown in Figs. 2, 18, 19, and 20. The desirable grain will not pass through the lower sieve 115 and will enter a spout 117, having swinging movement through the medium of pivoted hangers 118.

Any grain that may pass through the bottom sieve 115 will find its way through an opening $115^a$ in the bottom, near its forward end, extending nearly from side to side and into a receptacle placed to receive such grain. The fingers 116 effectually prevent any straw or undesirable matter from entering with the tailings into the box 111, from which box the tailings are delivered into a spout 119, carried by swinging bearings 120.

The cams 112 impart to the shoe an endwise reciprocating motion, while the spring-supports 110 at the front of the shoe compel a quick forward return, thereby thoroughly agitating the material on the sieves. At the right-hand side of the machine a horizontal arm 121 is connected with the spout 117, and the outer end of this arm is pivotally attached to one end of a lever 122, fulcrumed at or near its center upon a convenient support. A second arm $120^a$ is attached to the tailing-spout 119 and to the rear end portion of the lever 122. The rear end of the lever 122 is provided with a recess 123 or is forked to receive the periphery of a wabble-wheel 124, mounted upon a shaft 125 at the lower rear portion of the machine.

A pulley 126 is secured on the right-hand end of the shaft 125, being connected by a belt 128 with a pulley 127 on the cam-shaft 113, and a driving-pulley 129 is secured upon the right-hand extremity of the rear shaft 125. Between the forward and the rear sections of the separating-rack F pickers G are held to revolve. Two shafts 130 and 131 are journaled in the sides of the body over the rear section of the rack and at the rear end of the forward section, as shown in Fig. 2. Arms 132 are carried in opposite directions from the shafts 130 and 131, the arms being connected at their outer ends by angle bars or plates 133, extending in opposite directions or beyond opposite sides of the arms at opposite faces of the shafts.

Figure 7:
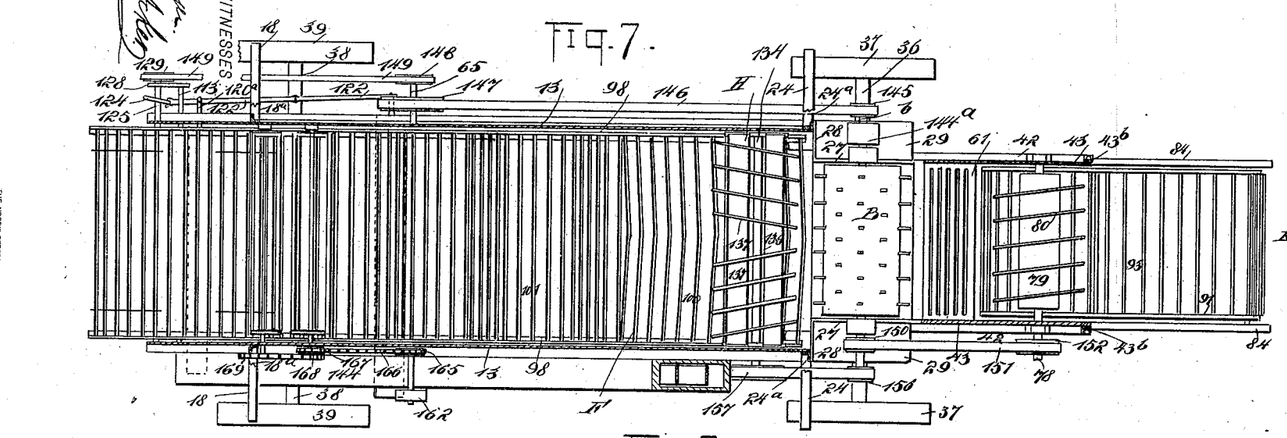
Fig. 7 is a section through the machine, taken slightly below the top.

A beater H is located over the forward end portion of the rack-section $f$ and just at the rear of the cylinder. The beater-shaft 134 extends from one side to the other of the body and the beater consists of disks or end pieces 135, which are secured to the shaft within the body near the ends of said shaft. Wings 136 are secured to the end pieces or disks, and the outer edges of the wings are turned backward in an opposite direction to the direction of rotation, as shown in Fig. 2. The beater is completed by the addition of a number of rings 137, which, as shown in Fig. 7, are placed obliquely upon the longitudinal wings; but the rings at one side of the center of the wings have an inclination in an opposite direction to the wings at the opposite side of said center.

A short floor 138 is at the bottom of the rear extension of the body and extends over the chaffing-riddle. The blower or fan is located in the casing 16 and is carried by a shaft 139, suitably journaled. The blower consists of a hub 140 and arms 141, which radiate from the hub near its ends, said arms at their outer extremities being twisted so as to present flat faces to the direction of rotation. The flat faces of the arms are connected by means of slats 142, forming paddles, the said slats or paddles being angular or L-shaped in cross-section. The spout 143 of the fan-casing directly faces the opening in the front of the shoe.

The bundles or sheaves are thrown upon that portion of the carrier 91 which passes over the trough 84 of the feed device under the knives of the band-cutter. The rotative speed of this is such that the knives have a motion greater than that of the moving bundles. As the bundles are carried under the cutter they are forced upward against the knives by the elliptical driving-wheels of the carrier, more especially by the one just below the band-cutter. The pressure thus brought to bear renders certain the cutting of the bands, and the lateral movement of the knives, by reason of their oblique mounting, distributes the straw evenly. The motion of the carrier also loosens the straw and throws the grain which may fall through the slats of the carrier onto the platform 94. The grain so shaken out is dragged along the platform 94 to the grating 61, through which it falls to the inclined floor 95. That which is threshed out by the feeding mechanism is by this means separated at once from the straw and prevented from being cut or damaged by the threshing-cylinder. If for any reason—as in threshing small seed—this separation is undesirable, a closed floor may be substituted for the grating 61. The threshing-cylinder and the concave, as heretofore stated, are of the usual construction, the grain being threshed out by being passed between the teeth of the cylinder and those of the concave. The straw is forced by the threshing-cylinder over the grating 60 and on to the first section of the separating-rack F. The raised center of this rack, together with the lateral motion of the obliquely-mounted rings on the beater, tends to spread the straw evenly over the entire width of the rack, which, it will be observed, is considerably greater than the length of the cylinder. The straw worked back by the motion of the rack passes over the risers 102, on to and over the pickers G, and on to the rear section of the separating-rack, and so out of the machine. The fish-back plates when used serve to divide the straw and to prevent any retrograde movement. During this process the straw has been so worked and agitated that the grain has been entirely shaken out. All that which has gone down the inclined floor 95, through the concave, the grating 60, and forward section, falls on and is conveyed by the conveyer to the chaffing-riddle. All the grain that falls through the rear section of the separating-rack slides or is worked down the inclined floor 138 by the downstroke of the rack and finds its way to the riddle. The openings in the chaffing-riddle being smaller than those between the slats or cross-bars of the racks and the motion of the riddle being less violent, it will allow all the grain to fall through, while a great deal of trash, such as broken straw, will be carried over at the rear of the machine. The blast of the fan blows upon and through the shoe, between the shoe and chaffing-riddle, and through the chaffing-riddle, carrying with it the chaff and dust. The sieve in the shoe allows the grain to fall through, while any heads of grain which have not been freed from chaff, as is sometimes the case in threshing wet grain, are carried over and fall through the openings between the wires or fingers 116, crossing the tailing-box 111, falling from this box into the tailing-spout, from which they are taken by an elevator 144, of any approved construction, and returned in the usual manner to the cylinder to be again passed through the machine. The openings in the screening-sieve are so small as to allow only small seed to fall through and find an exit at the bottom opening 115$^a$ in the shoe. The good grain rides over and falls into the grain-spout 117, by which it is conveyed out of the machine.

The driving pulleys and belts are usually arranged as follows: The main driving-pulley 144$^a$ is on the cylinder-shaft, as shown in Fig. 7, together with a smaller pulley 145. The pulley 144$^a$ is connected with any source of power, and the pulley 145 carries a driving-belt 146, which is likewise carried over a pulley 147 on the crank-shaft 65. The pulley 147 is at the right-hand end of the crank-shaft, as is likewise a second pulley 148. This pulley 148 is connected by a belt 149 with the pulley 129 on the rear shaft 125 of the machine. At the left-hand end of the cylinder-shaft a pulley 150 is secured, which is connected by a belt 151 with a pulley 152 on the left-hand end of the cutter-shaft 78.

The cutter-shaft, as shown in Fig. 1, also carries a second and smaller pulley 153, which is connected by a cross-belt 154 with a pulley 155 on the shaft 89, upon which the inner elliptical sprockets 90 of the carrier are secured. A second pulley 156 is secured at the left-hand end of the cylinder-shaft, and over this pulley a belt 157 is carried, which belt likewise passes over a pulley 158 on the left-hand end of the beater-shaft 134, the same belt 157 being carried over a pulley 159 on the fan-shaft, as shown in Fig. 1, and the belt 157 is rendered tight by means of the tightening-pulleys 160, operated by an attached lever 161, having a suitable rack. A pulley 162 is secured upon the left-hand end of the crank-shaft 65. This pulley, which is a small one, is connected by a belt 163 with a pulley 164 on the shaft of the driving-drum of the elevator 144. A second pulley 165 is secured upon the left-hand end of the crank-shaft 65, and this latter pulley is connected by a belt 166 with a pulley 167, located on the left-hand end of the foremost picker-shaft 130. The rear picker-shaft 131 is driven from the forward picker 130 by means of a belt 169 passing over a pulley 168 and a second pulley 168$^a$, as illustrated in Figs. 1 and 7. It will be observed that the driving of the various parts may be accomplished otherwise than shown.

I desire it to be understood that in the construction of the sprocket-supporting wheels for the feed-belt 91 all of the said sprocket-wheels except the wheels 88 may be of circular contour, said wheels 88 being of elliptical form.

Having thus described my invention, I claim as new and desire to secure by Letters Patent—

1. In a threshing-machine, the combination with a cylinder-frame, of a body-frame secured to the cylinder-frame, and consisting of two side frames connected together by cross-bars and each comprising an upper straight longitudinal bar, a lower forwardly-inclined longitudinal bar, vertical end bars, and oppositely-inclined braces secured to the upper and lower longitudinal bars, a rectangular brace-frame secured between the front ends of the lower longitudinal bars of the body-frame, an angular brace having its ends secured to the said longitudinal bars and its middle portion to the brace-frame, and an X-shaped brace secured to and between the upper longitudinal bars of the body-frame, substantially as described.

2. In a threshing-machine, the combination with the cylinder-frame, of a body-frame secured to the cylinder-frame and consisting of two side frames connected together, and each comprising an upper and lower longitudinal bar, the lower bar being inclined rearwardly and downwardly, vertical end bars, and oppositely-inclined braces secured to the upper and lower longitudinal bars, a rectangular brace-frame secured between the front ends of the lower longitudinal bars of the body-frame, an angular brace having its ends secured to the said lower longitudinal bars and its middle portion to the brace-frame, an X-shaped brace secured to and between the upper longitudinal bars, and a cross-bar connecting the side frames at each end, the said cross-bars having their ends extended beyond the sides of the frame and then inclined downwardly and inwardly and secured to the vertical end bars of the frame, substantially as described.

3. In a threshing-machine, the combination with a body-frame, of quadrangular side frames secured to the front end of the body-frame, a box-frame connecting the said quadrangular frames, and a cylinder-frame above the side and box frames and consisting of two plates secured to the vertical end bars and a cross-bar of the body-frame, and each provided with a side and bottom flange, and with an opening, said openings being adapted to receive the boxes of the cylinder, substantially as described.

4. In a threshing-machine, the combination with a body-frame, of quadrangular side frames secured to the front end of the body-frame, a box-frame connecting the said quadrangular frames, a cylinder-frame above the side and box frames and consisting of two plates secured to the vertical end bars and a cross-bar of the body-frame, and each provided with a side and bottom flange and with an opening, said openings being adapted to receive the boxes of the cylinder, and an angular frame secured to the box-frame and to the side plates of the cylinder-frame, substantially as described.

5. In a threshing-machine, a main frame, comprising two side frames, each formed of longitudinal and vertical bars, and inclined braces between the longitudinal bars, cross-bars connecting the side frames, the upper cross-bars having their ends extended and inclined downwardly and inwardly and secured to the vertical end bars, a brace-frame secured between the front ends of the lower longitudinal bars of the side frames, an angular brace secured to the brace-frame and to the lower longitudinal bars of the frame, a cylinder-frame secured to the front vertical bars of the main frame, and a frame for supporting the cylinder-frame and consisting of quadrangular side frames, and a box-frame connecting the quadrangular frames, substantially as herein shown and described.

6. In a threshing-machine, a metallic body-frame consisting of panels, each panel comprising connected beams of angle irons and plates secured to the beams, an upper transverse beam at each end of the frame, said beams being carried beyond the sides of the frame and bent downwardly and inwardly to an engagement with the frame at a point between its top and bottom, substantially as described.

7. A separating-rack for a threshing-machine, consisting of side bars and cross-bars connecting the side bars, sundry of the cross-bars being higher at their centers than at their ends, as and for the purpose specified.

8. In a threshing-machine, a separating-rack consisting of side bars of angle-iron and cross-bars of like formation and connecting the side bars, the cross-bars being upwardly arched, whereby the straw is equally distributed over the rack, as set forth.

9. In a threshing-machine, a separating-rack consisting of side bars and cross-bars connecting the side bars, the forward cross-bars being arched, and risers located at the rear of the arched cross-bars, said risers consisting of side bars secured to the side bars of the rack, and cross-bars connecting the side bars substantially as shown and described.

10. In a threshing-machine, a separating-rack the body portion whereof consists of side bars and cross-bars connecting the side bars, the cross-bars having a rearward inclination, the forward cross-bars being upwardly arched, and risers located at the rear of the arched cross-bars, having a rearward inclination and consisting of side bars secured to the side bars of the rack and cross-bars connecting the side bars, as and for the purpose specified.

11. In a threshing-machine, the combination, with a separating-rack constructed in overlapping sections, each section consisting of side bars and cross-bars having a rearward inclination, the forward cross-bars of the forward section being upwardly arched, of supports for the inner and outer ends of the sections, respectively, admitting of end movement, a crank-shaft connected with the outer end of the rear section and the inner end of forward section, and rearwardly-inclined grated risers carried by the forward section at the rear of its arched portion, substantially as described.

12. In a threshing-machine, the combination, with a separating-rack constructed in overlapping sections, each section consisting of side bars and cross-bars having a rearward inclination, the forward cross-bars of the forward section being upwardly arched, of supports for the inner and outer ends of the sections, respectively, admitting of end movement, a crank-shaft connected with the outer end of the rear section and the inner end of forward section, rearwardly-inclined grated risers carried by the forward section at the rear of its arched portion, fish-back plates located upon the rear section of the rack, and rotary pickers at the rear of the forward rack-section, being above the rear rack-section, substantially as described.

13. In a threshing-machine, the combination of a beater having oblique spreading-rings, and a separating-rack having arched cross-bars, substantially as described.

14. The combination with the cylinder-frame having curved slots, of a concave having slotted side flanges, blocks mounted to slide in said slots, a rod upon which the said blocks are mounted, a crank-shaft passing through apertures in the forward end of the concave, and having its ends extending out through the slots of the frame and mounted in bearings of the said frame, a handle on one end, and a pawl-and-ratchet mechanism for locking the crank-shaft, substantially as described.

15. The combination with a concave pivotally supported at one end, and means for adjusting the other end of the said concave, of a grain-conveyer having a hinged section extending beneath the concave, and a connection between the concave adjusting means and the hinged section of the conveyer, whereby the concave and the said hinged section will be adjusted together, substantially as described.

16. The combination, with a concave pivotally supported at one end, and a crank-shaft supporting the opposite end of the concave, and a locking device for the shaft, of a grain-conveyer having a hinged section beneath the concave, and a connection between the said hinged section and the crank-shaft, whereby the hinged portion of the conveyer and the concave will move together, as set forth.

17. The combination with a concave pivoted at one end, and a crank-shaft supporting the other end of said concave, of a grain-conveyer having a hinged section extending beneath the concave, and a yoke carried by the crank-shaft and extending beneath the free end of the said hinged section of the conveyer, substantially as described.

HAROLD ALVA RANDS.

Witnesses:
   THEODORE WHITTELSEY,
   JAMES R. ROBERTSON.